United States Patent [19]

Wilson

[11] 3,845,606
[45] Nov. 5, 1974

[54] PACKAGE SEALING IN STEAM ATMOSPHERE

[76] Inventor: Donald C. Wilson, 6879 Dartmoor Way, San Jose, Calif. 95129

[22] Filed: Feb. 27, 1974

[21] Appl. No.: 446,251

Related U.S. Application Data

[62] Division of Ser. No. 304,707, Nov. 8, 1972.

[52] U.S. Cl. ............... 53/21 FC, 53/22 B, 53/39
[51] Int. Cl. ................ B65b 51/30, B65b 7/06
[58] Field of Search ........... 53/22 B, 25, 21 FC, 39, 53/40, 373, 375, 379, 86, 110, 127; 156/583; 219/243

[56] References Cited
UNITED STATES PATENTS

| | | | |
|---|---|---|---|
| 2,281,187 | 4/1942 | Waters | 53/373 X |
| 2,651,350 | 9/1953 | Casey et al. | 156/583 |
| 2,802,086 | 8/1957 | Fener | 156/583 |
| 2,999,532 | 9/1961 | Bursak | 156/583 X |
| 3,162,564 | 12/1964 | Buchner | 156/583 X |
| 3,377,772 | 4/1968 | Lyon et al. | 53/373 X |
| 3,650,088 | 3/1972 | Wilson | 53/373 X |
| 3,673,041 | 6/1972 | Schultz et al. | 53/373 X |
| 3,748,207 | 7/1973 | Campbell et al. | 156/583 X |

*Primary Examiner*—Travis S. McGehee
*Assistant Examiner*—Horace M. Culver
*Attorney, Agent, or Firm*—R. S. Kelly; C. E. Tripp

[57] ABSTRACT

A sealing apparatus especially adapted for closing container pouches, either formed of, or coated with thermoplastic material, while the pouches are being processed in a steam atmosphere within a sterilizer or cooker. The disclosure particularly concerns the sealing head and the manner in which the cooperating elements of the sealing head coact to ensure intimate contact and coextensive bonding between the walls defining the open end of the pouch, while the pouch is in a steam atmosphere.

7 Claims, 8 Drawing Figures

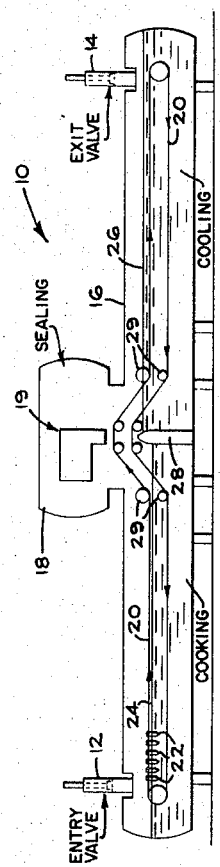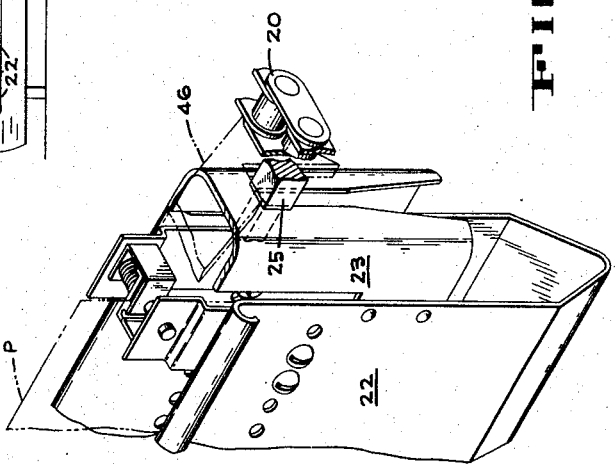

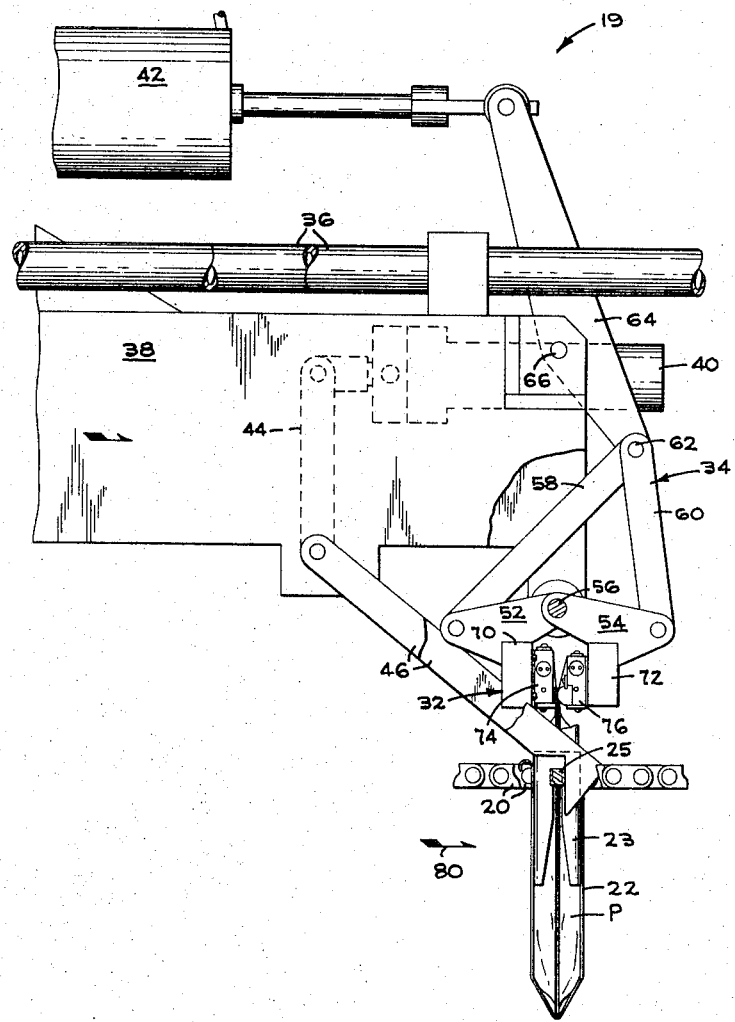
FIG_2

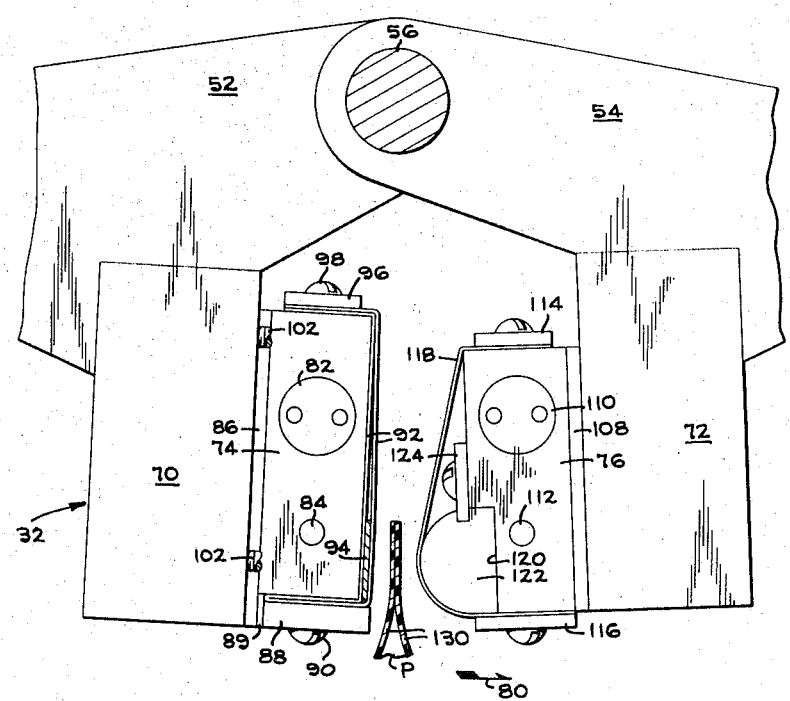
FIG_4
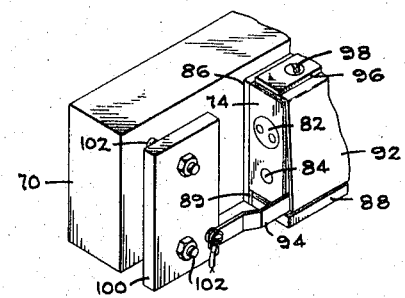
FIG_5

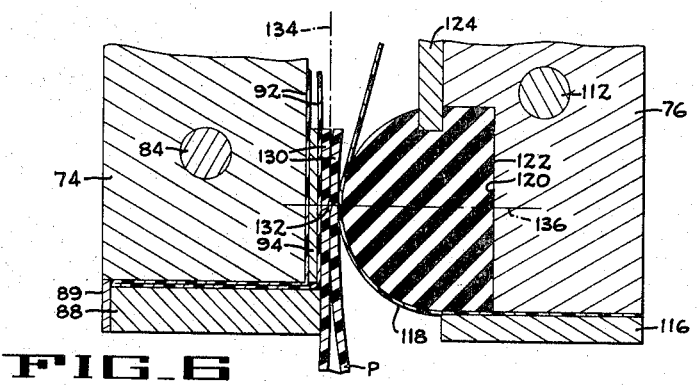
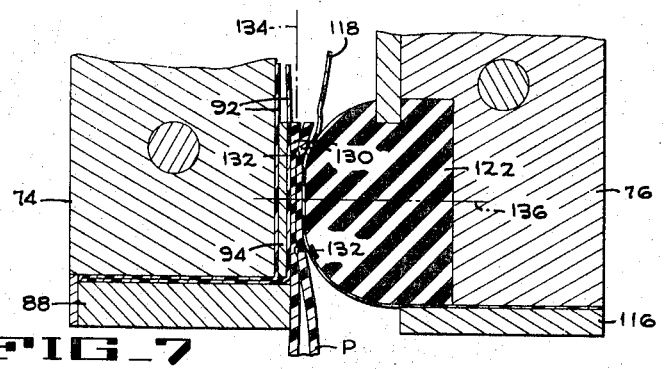
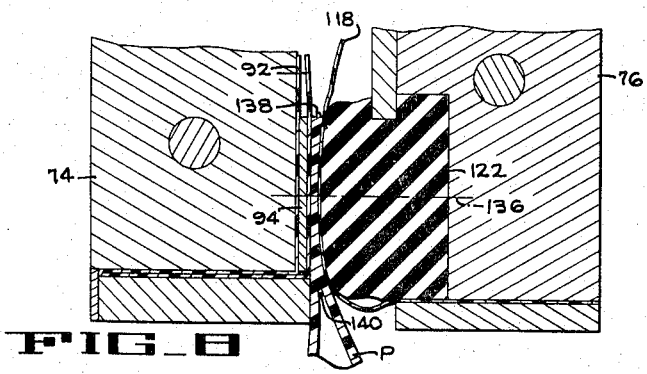

1

PACKAGE SEALING IN STEAM ATMOSPHERE

CROSS REFERENCE TO RELATED APPLICATIONS

The present application is a division of application Ser. No. 304,707 filed Nov. 8, 1972.

The present invention is an improvement over the method of heat sealing flexible pouches disclosed in my U.S. Pat. No. 3,650,088, issued on Mar. 21, 1972, and assigned to the assignee of the present invention. The patent discloses a high pressure, low temperature and long dwell method and apparatus for heat sealing pouches which are formed of a foil and thermoplastic laminate and which contain food products.

BACKGROUND OF THE INVENTION

The field of the present invention concerns methods for heat-sealing thermoplastic materials, such as the open end of a thermoplastic pouch, by the application of heat and pressure. More specifically, the present invention pertains to sealing operations which are carried out in a steam environment, and on filled, uncooled container pouches having cooked or sterilized contents.

Processing conditions of the type mentioned hamper sealing operations with thermoplastic films that have relatively high melt points. One problem is that heat sealing operations in a steam atmosphere can create heat blisters in the seal area of laminates which have high melting point layers, or sealants, that are to be bonded. One relatively new laminar film of this type has a polypropylene sealant layer which requires at least 300° F to melt and seal. The reason for blistering is that if the heat required for sealing is not dissipated to allow the thermoplastic film to harden before the clamping pressure of the sealing elements is released, the film will remain in its softened condition for a brief period of time. Moist vapors from the processing, along with hydrogen which is produced from the reaction of water with the aluminum foil lamination, diffuse into the sealant and boil. This results in blisters being formed in the seal area, and the walls of the pouch can thus be separated by the blisters. Even though the steam in the blisters will condense as the blistered areas cool, the collapsed bubble structures usually remain after the thermoplastic film solidifies. The blistered areas obviously form imperfect and deficient seals, and can extend completely across the sealing zone, thus resulting in an unsealed pouch and a rejected end product.

Another problem, similar to the foregoing, is that the product being packaged may include small particles that lodge on the seal surfaces before the sealing operation takes place, e.g., during the pouch filling operation. It is evident that any particles contaminating the sealing surfaces can also result in localized improper sealing and eventually rejected packages if the unsealed areas extend across the width of the seal; furthermore, even if the seal is effective, the unsealed areas may give the appearance of a defective seal and thereby cause the package to be rejected.

Heat migration from the seal area through the metallic foil laminate of a composite package material is another problem and may cause imperfect containers by softening and weakening the film which adjoins the seal area. Thus, even though the seal area itself may be perfect, migration of heat from the seal area through the metallic foil during the sealing operation can later result in rupture of the container at stress points spaced from the seal. This problem is particularly serious when the web material includes an aluminum metal foil vapor barrier lamination, because the aluminum conducts heat rapidly, and this transmitted heat causes the softening and weakening of the film, at a zone spaced from the seal, and localized stress points when the film hardens. However, the problem is not confined to laminates which include a metallic foil since any laminate is to some degree thermally conductive.

A further problem in the field of the present invention is that of providing an effective overall cooking or sterilizing system without impairing the production rate with an inordinately slow pouch sealing operation.

SUMMARY OF THE INVENTION

According to one aspect of the present invention, a flat gripping jaw and a resiliently flexible gripping jaw having an arcuate face of uniform radius cooperatively grip the seal area of a thermoplastic container. Both gripping jaws are heated to a temperature below the sealing temperature range of the thermoplastic material. Due to the arcuate configuration of the resilient gripping jaw, the gripping action begins with essentially line contact, following which the arcuate face deforms so as to progressively widen the area of gripping of the pouch. This produces an ironing and heating action, prior to the sealing operation, that simultaneously and effectively flattens the seal area in both directions to push contaminants out of the seal area and establish intimate contact of the container material and to evaporate any extruded water droplets which may be present. An impulse sealer, which may preferably be formed of a flat nichrome resistance element, is mounted across the face of the flat gripping jaw and is momentarily energized to effect the sealing action. Thus, even though contaminants, including water droplets, may initially exist within the area of the seal, the ironing action assures a complete seal by extruding these contaminants, which could otherwise destroy the integrity of the seal, before the sealing action occurs. While the ironing action is being effected by the heated sealing jaws, the impulse sealer is rapidly heated to sealing temperature to bond the thermoplastic material. Because the heated gripping jaws are at a temperature lower than bonding temperature, the gripping jaws function as a heat sink when the impulse sealer is deenergized to dissipate the heat of the sealing operation.

I have discovered that there are two distinct forms of blisters which can impair a heat seal. One type of blister, which may be termed a foaming blister, occurs within the thickness of the film because of the previously mentioned formation of hydrogen when moisture reacts with the aluminum foil layer. This causes internal blisters which, in effect, foam the film so that it becomes cellular. Both heat and moisture aggravate this condition. Although seals are usually effective when this condition exists, the package appears to be defective and is not commercially acceptable. The other form of blister may be termed a surface blister, because it results from a bubble entrapped between the sealing surfaces. As far as is known to me, the foaming type of blister and its adverse effects have not previously been recognized.

In the present method, the seal is rapidly consolidated while the seal area is gripped to either prevent, minimize or impair the incorporation of either type of blisters. The impulse sealing is accomplished with unusually low heat input, and thus minimizes the migration of heat away from the seal zone and lessens the probability of heating the pouch material for a period of time long enough to cause distortion. Because the minimal heat in the seal zone is later quickly dissipated, a relatively long and desirable clamping time during the heat buildup in the film is allowed. Furthermore, the quick dissipation of the sealing heat permits the early release of the sealing jaws and makes possible a relatively rapid overall sealing cycle.

In summary, the present invention comprises a sealing method which is especially adapted to:

1. Extrude contaminant particles from the seal area to effectively isolate such particles.
2. Provide a transversely flat seal without the necessity of sealing jaws that require precise alignment.
3. Preheat and pressurize the seal area to evaporate and extrude water droplets from the seal area which can cause surface blisters.
4. Utilize impulse heating to minimize the danger of undue heat migration, seal distortion, and the formation of foam blisters.
5. Function with a relatively fast sealing cycle to achieve good production rates.
6. Heat the seal zone of the container to near the temperature at which it begins to melt so that an impulse sealer can be used to effect the seal rapidly and without seal distortion, irregardless of the temperature differential between cooking temperature and the lower range of the melt temperature of the container material.

BRIEF DESCRIPTION OF THE DRAWINGS

FIG. 1 is a diagrammatic section of a steam heated cooker for cooking products within flexible container pouches.

FIG. 2 is a diagrammatic side elevation of a sealing mechanism adapted to utilize the method of the present invention and a carriage for moving the sealing mechanism in synchronism with the moving container pouches.

FIG. 3 is a diagrammatic isometric of a portion of a container pouch carrier shown in FIG. 2.

FIG. 4 is an enlarged elevation of a fragment of the sealing mechanism shown in FIG. 2.

FIG. 5 is an isometric of one end of the sealing mechanism shown in FIG. 4.

FIG. 6, 7 and 8 are enlarged diagrammatic operational views of the container pouch and sealing mechanism shown in FIG. 4 and illustrate successive operational steps in forming the seal.

DESCRIPTION OF THE PREFERRED EMBODIMENT

FIG. 1 illustrates a continuous cooker or sterilizer 10 for processing flexible containers. A typical flexible container is an initially open-top pouch having walls of laminar construction incorporating a heat-sealable thermoplastic film. For example, one such laminar film presently used comprises a polyolefin layer, 3.2 mils thick, which is bonded to an aluminum foil layer 0.35 mils thick. The other side of the aluminum foil is bonded to a polyester film 0.5 mils thick. When the pouch is formed, the relatively thick polyolefin layer is on the inside of the pouch and the walls of the pouch are heat sealed together by heat-bonding or welding the inner surfaces of the polyolefin material.

The pouches are filled with a food product and mounted in a pouch carrier to faciliate their handling and transport through the cooker 10, or a similar cooker or retort in which a steam atmosphere heat treats the product. As in the case of my aforementioned U.S. Pat. No. 3,650,088, the pouches are sealed within the cooker 10, and are cooled before being discharged for packaging or other handling steps which may be required. The cooker 10 is merely representative of a typical operating environment, and its details are not critical to the present invention.

As the result of the actual practice of the invention disclosed in my above identified patent, it has been determined that the sealing operation is not effective with all polyolefin sealant layers that are now used in laminar films and that the duration of the sealing cycle is too long to meet ideal market standards. Also, the seal area is transversely curved and detrimental to the appearance of the pouch. Another adverse condition is that the cooking process inevitably results in water vapors from both the food product and the steam environment diffusing through the polyolefin layer to contact the aluminum foil layer. Thus, heating these surfaces to a sealing temperature above about 300° F when the surfaces are clamped together under high pressure causes hydrogen and pressurized steam (above 50 psi) to be formed. If the clamping pressure during sealing is below 50 psi, then blisters will form in the sealing area while the clamping jaws are closed; if a highe clamping pressure is used, the blisters will immediately form after the clamping jaws release the seal area. Therefore, a sealant layer requiring a sealing temperature above 300° F to melt and fuse cannot be successfully used with the sealing method disclosed in my U.S. Pat. No. 3,650,088.

A heat control problem of prior art sealing heads is that a given laminated web may have a heat sealable inner layer which begins to melt at about 290° F. The sealing jaw must in this case be heated to about 300° F. If the cooking or sterilizing temperature is 212° F, the temperature differential between the cooking and the sealing jaw temperatures is therefore at least 88° F. Thus, a sealing jaw heated to a point sufficient to effect the seal carries so much residual heat that the problem of controlling the heat is critical. This control problem applied both to continuously heated sealing jaws and to impulse sealers.

In the present process, the heat control problem is met by preheating the sealing jaws to a temperature just below the melt temperature of the film and by effecting the sealing operation with an impulse sealer. In the example given, the sealing jaws would be heated to 280° F, thus requiring only a 20° F temperature rise in the impulse sealer for the sealing operation. This can be done with a very low heat input to the impulse sealer which allows easy heat control since the power requirements and temperature rise of the impulse sealer are low.

To reduce the duration of the sealing cycle for films whose melt point is below 300° F, a high seal bar temperature can be used, but the limitation in most of the presently available laminar webs is that heat above 300° F, or thereabouts, causes the seal area to distort and wrinkle and can also result in the flattened and extruded plastic in the seal area forming interrupted globules instead of a continuous extruded bead or rib bordering the length of the seal. While a continuous bead will reinforce the seal, interrupted globules result in localized stress points which weaken the seal. Another adverse condition which is related to the foregoing is that the aluminum foil vapor barrier layer is such a good conductor that heat can migrate laterally beyond the transverse dimension of the seal and cause spot sealing which weakens the web along a line parallel to and displaced from the seal. The foregoing problems in effecting seals of the type indicated have been effectively solved with the present invention by the preheating of the seal jaws to reduce the temperature differential as stated and by using low power input for the impulse sealing operation.

Referring again to FIG. 1, the cooker 10 includes an entry valve or air lock 12, an exit valve or air lock 14, and an elongate closed cooker shell 16 on which the air locks are mounted. At about the center of the cooker shell, a sealer shell 18 encloses sealing mechanism 19 for the pouches. Between the entry air lock 12 and the sealer shell 18 is the cooking section where the product is cooked and sterilized in the pouches. Between the sealer shell and the exit air lock 14 is the cooling section where the sealed pouches are cooled to substantially ambient temperature before discharge through the exit air lock. Two laterally spaced, continuously moving endless conveying chains 20, one of which is indicated by the center line shown in FIG. 1, move the pouches through the cooker 10.

As is disclosed in my aforementioned patent and diagrammatically disclosed in FIG. 2, two filled pouches P are mounted in a pouch carrier 22. In the patented structure, the carrier 22 is permanently mounted on the conveying chains. In the present instance, the carriers 22 enter and leave the cooker 10 via the air locks 12 and 14 and are mechanically handled within the cooker to place a slotted mounting bracket 23 (FIGS. 2 and 3) on each end of the carrier onto an inwardly projecting pin 25 that is carried by the adjacent chain 20. Thus, each carrier is transferred onto the upper flights of the conveying chains 20 for movement through a steam-heated water bath 24 in the cooking section, and a cool water bath 26 in the cooling section with the two baths being separated by a barrier wall 28. Adjacent guide sprockets 29 direct the chains 20 over the barrier wall 28 and through the lower section of the sealer shell 18 in order to make the pouches accessible to the sealing mechanism 19.

The sealing mechanism 19 (FIG. 2) includes a sealing head 32, and actuating linkages and mechanism 34 which are similar to the structure disclosed in my previously identified U.S. Pat. No. 3,650,088. Details of the actuating mechanism 34 are not a critical part of the present invention, and such apparatus can be any of various structures which will operate to move the sealing head 32 with the pouches while the pouch sealing operation takes place.

The general structure of the sealing head actuating mechanism 34 (FIG. 2) includes parallel guide rails or tubes 36 which slidably mount a reciprocable carriage 38. Movable with the carriage 38 are indexing and sealing air cylinders 40 and 42, respectively. Another air cylinder, not shown, retracts the carriage 38 in an upstream direction prior to each sealing cycle. The sealing cylinder 42 provides the gripping force for the sealing head 32.

The indexing cylinder 40 indirectly couples the carriage to the chains 20 for movement downstream with two of the pouches P. For the latter purpose, the indexing cylinder 40 is arranged, when energized, to move a link 44 and swing a hook arm 46 at each side of the carriage downward to engage portions of the inwardly projecting pins 25 (FIG. 3). As previously indicated, two opposed pins 25 removably support each pouch carrier 22 and are arranged in closely spaced pairs along the chains 20 for moving the carriers and pouches through the cooker 10. Since the hook arms 46 are pivoted to the carriage 38, the carriage follows the pouch carrier whose support pins 25 are engaged by the hook arms. To prevent swinging of the carriers, the pins 25 are made to be non-rotatable and have square portions engaged by the hook arms and by the slotted mounting brackets 23.

Interconnected levers 52 and 54 (FIG. 2) are pivotally mounted on a shaft 56. Shown in closed position in FIG. 2, the levers are conjointly movable upward about the pivot shaft 56 by links 58 and 60. The links 58 and 60 have a common pivot connection 62 to a pivot arm 64. Arm 64 is pivoted at its opposite end to the piston rod of the air cylinder 42 and is pivoted intermediate its ends to the carriage 38 by means of a pivot stud 66.

Levers 52 and 54 (FIG. 4) respectively carry mounting blocks 70 and 72, and the mounting blocks support sealing and gripping jaws 74 and 76 of the subject sealing head 32. In the position shown in FIG. 4, the sealing and gripping jaws are slightly open and are in the process of being closed together by the sealing cylinder 42 (FIG. 2) on the upper unsealed end of a pouch P which is traveling in the direction of the arrow 80. The indexing cylinder 40 has engaged the hook arms 46 with the chain pins 25 so that the chains are pulling the carriage 38, thus moving the sealing head 32 along with the pouch.

An important detail of the present invention, which is in contrast to the sealing methods used in previous dual lane systems, is that only one sealing head is necessary wherein it has formerly been customary to use two sealing heads 32 in endwise alignment. In the present case, one sealing head can cover both lanes and, in fact, can be made in lengths as long as several feet because, as will later become evident, the usual problem of precise alignment between sealing jaws is non-existent and heat warpage is not a problem because the heat input for sealing is so low.

The flat gripping jaw 74 is a relatively large bar formed of a metal having high heat conductivity, such as aluminum, and is provided with an internally mounted resistance heating element 82. A thermocouple element 84 is mounted in an adjacent aperture of the bar, and is connected to a control circuit, now shown, for energizing and deenergizing the heating element in order to maintain a desired constant temperature about 10° F below the melt temperature of the pouch material. The gripping jaw 74 is rigidly connected to the mounting block 70 but is thermally isolated therefrom by an interposed heat-insulating sheet 86, such as asbestos.

At the bottom edge of the gripping jaw 74, an elongate plate 88 is clamped by screws 90, only one of which is shown, against the closed fold of a two layer Teflon-impregnated glass cloth sheet 92 such as is commonly used to prevent adherence to a heated thermoplastic web. Sandwiched between the two layers of the sheet 92, and thereby electrically insulated, is a flat nichrome resistance heating ribbon 94 which is only periodically electrically energized, in the known manner, to effect impulse sealing. The upper ends of the Teflon sheet 92 are secured to the sealing jaw 74 by a plate 96 and screws 98. One edge of the plate 88 abuts a shim 89, the purpose of which is to position the opposite edge of the plate 88 substantially flush with the inner face of the Teflon-glass cloth sheet 92 in order to provide a heat sink which will absorb thermal energy that may migrate from the sealing zone of the pouch.

As shown in FIG. 5, the impulse sealer ribbon 94 extends beyond the end of the gripping jaw 74 and is anchored to an insulator block 100, which is, in turn, secured to threaded mounting studs 102 that project from the mounting block 70. The other end of the impulse sealer is similarly mounted to electrically isolate the impulse sealer from the mounting block and provide conveniently accessible electrical input terminals.

Referring again to FIG. 4, the gripping jaw 76 is formed of a good heat conductor, such as aluminum, and is rigidly connected to the mounting block 72 with an interposed heat barrier sheet 108 of asbestos or the like. A resistance heating element 110 and a thermocouple 112 are provided for constant and closely controlled heating of the gripping jaw 76 by the same control means mentioned in connection with the heating of gripping jaw 74. Clamped to the gripping jaw 76 by upper and lower plates 114 and 116 and extending over the inner face of the jaw is a Teflon impregnated glass cloth sheet 118 which contacts the web material of the pouch.

A notch 120 is formed in the lower inner edge of the gripping jaw 76, and a resilient anvil 122 is mounted in the notch where it is supported by the lower plate 116 and keyed to a face plate 124. The anvil is formed of a heat-resistant rubberlike compound having properties which make it relatively hard, but capable of temporarily deforming under a pressure of 200–250 psi. One such material is marketed under the U.S. trademark VITON, and a suitable hardness for the pressure range stated is about 70 DUROMETER.

As an indication of the relative sizes of the impulse sealer 94 and the resilient anvil 122 for a pouch having a seal 3/8 of an inch wide, the anvil may have an arcuate face with a radius of 1/4 of an inch and the impulse sealer ribbon 94 may be 3/8 of an inch wide. The two gripping jaws are vertically positioned so that the impulse sealer and resilient anvil contact each other symmetrically, i.e., they are vertically centered relative to each other. When the sealing head 32 is used for different widths of seals in other production runs, it is desirable to mount one (or both) of the gripping jaws 74 and 76 for vertically adjustable movement to preserve the stated symmetry when another size anvil and/or impulse sealer is installed.

In general, it has been found desirable for the gripper jaws 74 and 76 to be maintained in the order of 10° F below the temperature at which the web material begins to melt. This preheats the open end of the pouch for the sealing operation and can be used under those processing conditions wherein the open end of the pouch is not submerged. However, it should be mentioned that the sealing head 32 will also effect satisfactory seals when the open end of the package is immersed. Only the impulse sealer 94 is energized for immersed sealing because the gripping jaws are obviously at the temperature of the water bath and cannot preheat the film above that temperature before the sealing operation.

A convenient manner of stating the thermal effect of the impulse sealer ribbon 94 is to specify the wattage per square inch of heat radiating surface, since this definition can be universally applied to any size heat ribbon and because this wattage can easily be regulated by the voltage input. Thus, in an idealized example, a ribbon 12 inches long with a resistance of 1 ohm will draw 12 amps at 12 volts input, and consume 144 watts, or 12 watts per linear inch. If the ribbon is 1/8 of an inch wide, the thermal effect is that of 96 watts per square inch of heat radiating surface.

With reference to a laminate film of the type previously described, with a cooking or sterilizing process carried out at 212° F., and with the electrical input to the impulse sealer 94 being 32 watts per square inch of heating surface, one set of operating times and temperatures are as follows: The commercially available film begins its melting range at about 300° F., and the gripper jaws 74 and 76 are heated to about 290° F. When the gripper jaws have gripped the web, the impulse sealer 94 can be energized for as little as 1.8 seconds to effect the seal.

If the electrical input to the impulse sealer is increased to 64 watts per square inch of heating surface under the same conditions set forth, the sealing time is reduced to about 1.4 seconds. With both the 1.4 second and the 1.8 second sealing times, the gripping pressure can be released only 0.5 seconds later, because the seal has by that time consolidated as a result of the advantageous heat sink characteristics of the gripping jaws which is due to the mass of the jaws and their high thermal conductivity and also due to the relatively low energy input to the impulse sealer 94.

It will be apparent that the overall sealing cycle must also include the time for closing the gripper jaws. In the present case, the jaw closing time before impulse sealing is purposely made relatively long (about 1 second) for reasons which will be presently explained. In the example given wherein the impulse sealer is operated for about 1.8 seconds, the overall cycle time is about 3.9 seconds. In the second example, wherein the impulse sealer is energized for only about 1.4 seconds, the overall cycle time is reduced to about 3.4 seconds. Prior to the energization of the impulse sealer, the heated gripper jaws close to full gripping force of about 200–250 psi over a period of about 1 second, and during this portion of the cycle the inner layer of film is extruded and progressively ironed out in each transverse direction from a line longitudinally bisecting the seal, as will be next described with reference to FIGS. 6, 7 and 8.

It should first be noted that the pouch P (FIGS. 6–8) is illustrated with only single thickness walls, due to limitations imposed by the scale of the Figures, but it will be understood that such walls are actually formed of laminar film such as the previously specified laminations using an inner layer of 3.2 mil polyolefin, an intermediate layer of 0.35 mil aluminum foil, and an outer layer of 0.5 mil polyester. The polyolefin layers of the two walls 130 which define the open end of the pouch are confronting each other and are ultimately bonded or welded together by the impulse sealer 94 to seal the pouch. The walls 130 are, of course, already bonded together at the sides and bottom of the pouch, and the present sealing operation completes the pouch in the sealer shell 18 (FIG. 1) for cooling in the water bath 26 and discharge through the exit air lock 14.

With the pouch material previously described, the temperature at which the thermoplastic laminations of the pouch P begin to melt is in the order of 300° F, and the gripping jaws 74 and 76 are maintained at a temperature of about 290° F so that the walls 130 are preheated when gripped to minimize the thermal input necessary to seal the pouch and to thereby minimize the dwell period required for sealing. This preheat temperature also evaporates moisture droplets which have been extruded from the seal area but adhere along or close to the edges of the seal.

It is assumed that the prior filling operation for the pouch left a contaminant particle 132 (FIGS. 6–8) on the sealing zone or area of the walls 130, this sealing area corresponding to the vertical dimension of the impulse sealer 84 and to the width of the pouch P. The sealing cylinder 42 (FIG. 2) is actuating the pivoted lever 64 and the links 58 and 60 to simultaneously close the gripper jaws 74 and 76 about a center line 134 against each side of the pouch. It will be noted that initial contact with the pouch (FIG. 6) is essentially line contact along a longitudinal horizontal plane 136 bisecting the resilient anvil or jaw 122 and the impulse sealer 94.

FIG. 7 illustrates the resilient jaw 122 deforming under the gripping pressure, the deformation flattening the face of the jaw 122 and progressing uniformly the gripping area both above and below the plane 136. As a result, the walls 130 of the pouch P are firmly forced together along the plane 134, and are progressively ironed together as the gripping jaws move to the full gripping position as shown in FIG. 8. The contaminant particle 132, by this ironing action, is extruded toward the top and bottom edges of the sealing area and out of the sealing area. It is important to note that the pouch is also being heated along the seal zone by the heated gripping jaws.

If the contaminant is a water droplet, the heat input to the web material from the 290° F preheat temperature of the gripping jaws will boil the water away when the droplet is forced away from the central portion of the seal area. In FIG. 7, the droplet is shown as being divided into two smaller droplets 132 which are located at each side of the pressure gripping area of the seal. It is apparent, therefore, that the sealing operation includes two distinct phases, a pressure wave phase with the pressure wave moving outward in both directions as the resilient jaw 122 begins to deform, and a heat wave phase as the preheat temperature of the gripping jaws is increasingly transferred into the web material.

If the contaminant particle 132 is a solid, for example a vegetable leaf which is usually considered as difficult to accommodate in a satisfactory seal between thermoplastic films due to its extremely thin section and its inherent fibrous strength, substantially the same extrusion process is effected. Thus, the body of the leaf is forced out of the sealing area by the relatively high clamping pressure and the progressive manner in which it is applied at each side of the initial line contact on the plane 136. The liquid constituents on the leaf are boiled away, as in the case of the water droplet contaminant. Any fibrous material which remains may be readily imbedded into the later melted plastic bead or rib 138 or 140 at the edge of the seal area when the impulse sealer is energized.

Thus, if the cooking or sterilizing temperature of the cooker is being carried out at 212° F, the seal zone of the pouch is being heated by the gripper jaws at 290° F to about 78° F above the environmental temperature of the thermoplastic material of the pouch. Consequently, moisture from the steam environment is present on the pouch surfaces in FIG. 7 which are to be bonded together, but the preheat temperature of 290° F being conducted into the pouch walls is causing the moisture to boil and evaporate.

The boiling can cause surface blisters between the walls of the pouch, but it will be appreciated that it is extremely unlikely that a surface blister can achieve a stable position within the sealing zone because the progressive ironing action of the resilient jaw 122 will cause the blister to collapse. If a foraming blister is internally formed in the pouch walls as previously described, it is flattened by the gripping pressure, and the melted plastic is consolidated before the gripping pressure is removed, as will be presently described. Since surface blisters are destroyed before they can be incorporated into the seal, the foaming type of blisters are the more difficult to accommodate within the seal area.

After full gripping pressure has been applied to the walls of the pouch, as shown in FIG. 8, the resilient jaw 122 has flattened over the entire area of the sealing zone, and the contaminant particle 132 has been extruded. At this time the impulse sealer 94 is energized for 1.8 seconds with the previously explained 32 watts per square inch of electrical power, or for 1.4 seconds with 64 watts per square inch. The temperature of the film laminations in the seal zone rapidly rises past the melt temperature of 300° F because the impulse sealer is at 290° F before being energized. Due to the fact that the gripping pressure on the walls is at its maximum 200–250 psi, the melted inner and outer thermoplastic layers are extruded transversely of the length of the seal to form continuous beads or ribs 138 and 140 bordering the top and bottom, respectively, of the sealing zone. These ribs, when solidified, reinforce the borders of the sealing zone by providing, in effect, two spaced tear-resistant beams isolating the sealing zone.

At the completion of the dwell period of energization of the impulse sealer 94, the residual heat in the sealing zone must be dissipated to cool the pouch below 300° F and harden the pouch material before the clamping pressure is released. If the clamping pressure is released too soon, a foam blister may be formed which would cause the pouch to be rejected. This heat dissipation in the sealing zone is quickly and effectively accomplished. One reason for this quick heat dissipation is that the relatively short dwell and heat input of the impulse sealer 94 allows only a very limited heat buildup in pouch areas bordering the seal. A further beneficial result of the short dwell period, coupled with the relatively low energy input to heat the impulse sealer, is that the thermally conductive aluminum foil lamination of the pouch transfers little heat away from the sealing zone. What little heat does migrate downward is transferred into the clamp bar 88, which forms a secondary heat sink cooler than the gripping jaw 74 because it is thermally isolated by the double layer of the Teflon-glass cloth sheet 92. This precludes the foil layer from effecting a weakening of the thermoplastic layers at a spaced distance from the sealing zone.

A second reason for the rapid cooling of the pouch after the impulse sealer is deenergized, is that the relatively large masses of the gripper jaws 74 and 76, and their high thermal conductivity, makes the jaws efficient heat sinks for conducting heat from the sealing zone so that the pouch temperature drops below the 300° F melt point in the previously stated 0.5 seconds and can be released at that time. Then, with the pouch sealed and the sealing zone solidified, the hook arms 46 (FIG. 2) can be released and the sealing mechanism can be returned upstream by the carriage 38 to carry out the same cycle of operation with the next pouch carrier and pouches. The sealed pouches and their carriers then descend on the upper chain flight 20 for immersed movement through the water cooling bath 26 and discharge through the exit air lock 14.

While a specific sealing example has been given for a film having a beginning melt point of about 300° F, the same beneficial results are obtained with materials having higher melt points. The major reasons for this are that the preheat temperature of about 10° F below the melt temperature minimizes the heat input for sealing by the impulse sealer 94 yet allows the gripping jaws 74 and 76 to rapidly withdraw residual heat after the sealing operation. Of course, the advantages previously ascribed to the particular mounting of the impulse sealer close to the gripping jaw 74, the heat sink afforded by the element 88, the deformation of the resilient jaw 122, and all of the other described structural features provide advantages which are still attained with films having higher melt temperatures.

A further important point to be noted is that the manner in which the resilient jaw 122 deforms to flatten against the web material produces a flat seal, a valuable appearance consideration for marketable packages. It has been found that a reversal of the structure - using a rigid, arcuate face jaw in lieu of the jaw 122, and a flat resilient anvil in place of the gripping jaw 74 - will cause the resulting seal to be transversely curved and, therefore, less desirable. The sealing head can be of unusual length (as long as six feet, for example) because of the use of the impulse sealer to perform the actual sealing operation. This obviously reduces the cost of the sealing head over the usual multiple assemblies required, increases its possible usefulness, and eliminates the precise setup and periodic adjustment procedures that are necessary with many ordinary sealing heads.

Although the best mode contemplated for carrying out the present invention has been herein shown and described, it will be apparent that modification and variation may be made without departing from what is regarded to be the subject matter of the invention.

What is claimed is:

1. A process of heat sealing flexible container pouches within a steam atmosphere, each pouch having confronting sealing surfaces of which at least one is formed by a thermoplastic material; said process comprising the steps of surrounding said sealing surfaces with a steam atmosphere; bringing the sealing surfaces together along a common contact line; pressing the sealing surfaces together in intimate contact under a gripping pressure beginning at the contact line and moving progressively outward in a lateral direction therefrom to expel foreign matter from between the sealing surfaces; simultaneously preheating the sealing surfaces as they are pressed together to a temperature higher than the temperature of the steam atmosphere and lower than the sealing temperature of the thermoplastic material; maintaining said temperature until liquid droplets between the sealing surfaces are varporized and the temperature differential between the temperature of the thermoplastic material and the sealing temperature thereof is substantially reduced; momentarily heating the sealing surfaces to the sealing temperature of the thermoplastic material while maintaining the gripping pressure on the sealing surfaces; reducing the temperature of the sealing surfaces to a temperature lower than the sealing temperature while maintaining the gripping pressure thereon; and releasing the gripping pressure on the sealing surfaces.

2. A process as described in claim 1 wherein the thermoplastic material has a sealing temperature of about 300° F and the sealing surfaces are heated to the sealing temperature by an electrical input in an approximate range of between 32 and 64 watts per square inch of heating surface for periods of between 1.8 and 1.4 seconds, respectively.

3. A process as described in claim 1 wherein the preheated temperature of the sealing surface of the thermoplastic material is about 10° F lower than the sealing temperature thereof.

4. A process as described in claim 1 wherein the common contact line between the sealing surfaces is located in the central portion thereof and the sealing surfaces are pressed together in intimate contact moving preogressively outward in lateral directions on opposite sides of the contact line.

5. A process as described in claim 1 wherein the gripping pressure between said sealing surfaces is about 200–250 p.s.i.

6. A process as described in claim 1 wherein the overall cycle time is about 3.4–3.9 seconds.

7. A process as described in claim 1 wherein the gripping pressure can be released about one-half second after completion of the momentary heating of the sealing surfaces.

* * * * *